(12) United States Patent
Makino (10) Patent No.: US 7,715,411 B2
(45) Date of Patent: May 11, 2010

(54) STORAGE APPARATUS AND DATA TRANSFER METHOD

(75) Inventor: Tomoya Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 11/654,633

(22) Filed: Jan. 18, 2007

(65) Prior Publication Data

US 2008/0080383 A1 Apr. 3, 2008

(30) Foreign Application Priority Data

Sep. 28, 2006 (JP) ............................. 2006-265882

(51) Int. Cl.
*H04L 12/28* (2006.01)
(52) U.S. Cl. ................... 370/395.7; 370/465
(58) Field of Classification Search ................ 370/535, 370/395.7, 465, 230; 710/38, 1; 455/452; 711/112; 365/189, 191
See application file for complete search history.

(56) References Cited

U.S. PATENT DOCUMENTS

| | | | | |
|---|---|---|---|---|
| 5,717,641 | A * | 2/1998 | Ando et al. ................ | 365/191 |
| 5,978,355 | A * | 11/1999 | Yamaguchi ............... | 370/395.7 |
| 6,788,703 | B2 * | 9/2004 | Tran ........................... | 370/465 |
| 7,406,562 | B2 * | 7/2008 | Saga et al. .................. | 711/112 |
| 7,509,443 | B2 * | 3/2009 | Matsuo et al. ............... | 710/38 |
| 2002/0064188 | A1 * | 5/2002 | Mizobata .................... | 370/535 |
| 2003/0109261 | A1 * | 6/2003 | Razavilar et al. ........... | 455/452 |
| 2004/0236906 | A1 | 11/2004 | Matsushige et al. | |
| 2006/0087893 | A1 * | 4/2006 | Nishihara et al. ...... | 365/189.01 |
| 2007/0168564 | A1 * | 7/2007 | Conley et al. .................. | 710/1 |

FOREIGN PATENT DOCUMENTS

| | | |
|---|---|---|
| JP | 2000-187938 | 7/2000 |
| JP | 2003-308180 | 10/2003 |
| JP | 2004-348464 | 12/2004 |

\* cited by examiner

*Primary Examiner*—Kwang B Yao
*Assistant Examiner*—Syed Bokhari
(74) *Attorney, Agent, or Firm*—Staas & Halsey LLP (57) ABSTRACT

A controller controls exchange of data between a plurality of storage units based on transfer rates of the storage units and a fixed rate. If at least one of the transfer rates of a transfer-source storage unit and a transfer-destination storage unit are different than the fixed rate, the controller accumulates a certain amount of data, and outputs accumulated data to the transfer-destination storage unit at the transfer rate of the transfer-destination storage unit so that data is transferred from the transfer-source storage unit to the transfer-destination storage unit at apparently at the fixed rate.

11 Claims, 8 Drawing Sheets

STORAGE APPARATUS AND DATA TRANSFER METHOD

BACKGROUND OF THE INVENTION

1. Field of the Invention

The present invention generally relates to data storage and data transfer techniques, and particularly relates to a storage apparatus and a data transfer method capable of using storages at different transfer rates in a network.

2. Description of the Related Art

Recently, there has been a remarkable development in information technologies relating to computers and communications, and vast amounts of data are being handled. To store vast amounts of data, such storages as a plurality of hard disk devices or magnetic tape devices are used while being connected to one another. A system called storage area network (SAN) is constituted by connecting these storages to a server or the like so as to be able to efficiently store and manage vast amounts of data.

In the SAN, data is transferred at transfer rate in gigabits according to a protocol such as Fiber Channel Protocol (FCP). Examples of the topology of the SAN include a fiber channel-arbitrated loop (FC-AL) with which the storages are connected into a loop. All the storages in the loop need to have the same transfer rate. It is, therefore, impossible to add a hard disk device having a transfer rate of, for example, 2 gigabits per second (Gbps) into a loop of hard disk devices each having a transfer rate of 4 Gbps.

One possible approach to solve the disadvantage is to add only a hard disk device having a transfer rate of 4 Gbps to the loop of hard disk devices having the transfer rate of 4 Gbps. Another possible approach is to reduce the transfer rate of the hard disk devices in the loop from 4 Gbps to 2 Gbps before adding the hard disk device having a transfer rate of 2 Gbps. However, with the former approach, the degree of freedom of selection is small because of the restriction on the transfer rate of the hard disk device that can be added. With the latter approach, throughput is reduced due to the reduction in transfer rates of all the hard disk devices.

The following technique is described in, for example, Japanese Patent Application Laid-Open No. 2004-348464. A plurality of storages at different transfer rates is mixed in one loop by using a predetermined circuit that shapes signals passing in the loop to make frequencies of the signals on a communication path coincident with one another.

However, various processes such as a process for comparing phases of the signals are required to shape the signals in the loop, which disadvantageously increases the size of the circuit. That is, the storages having different transfer rates transmit or receive signals at different frequencies because of disparity in transfer rate. To make the different frequencies coincident, it is necessary to calculate a phase difference among the signals transmitted and received by the respective storages, and to reduce this difference to be close to zero. As a result, the signal shaping requires many circuits such as a phase comparator and an oscillator, and increases the size of the entire circuit.

Moreover, the signal shaping requires some processing time. Due to this, if a storage having a different transfer rate is added into the loop, a time lag is generated before the entire loop is actually operable.

SUMMARY OF THE INVENTION

It is an object of the present invention to at least partially solve the problems in the conventional technology.

According to an aspect of the present invention, a storage apparatus that includes a plurality of storage units that store therein data, each of the storage units having a unique transfer rate, and controls transfer of data from a transfer source to a transfer destination, at least one of the transfer destination and the transfer source being one of the storage units includes a transfer-rate storing unit that stores therein the transfer rates of at least some of the storage units; a controlling unit that receives data from the transfer source to be transferred to the transfer destination, accumulates therein the data if at least one of the transfer rates of the transfer source and the transfer destination present in the transfer-rate storing unit is different from a fixed rate, and transfers a portion of accumulated data to the transfer destination at a rate corresponding to the transfer rate of the transfer destination such that the data is transferred from the transfer source to the transfer destination at the fixed rate.

According to another aspect of the present invention, a method of controlling transfer of data from a transfer source to a transfer destination among a plurality of storage units, each of the storage units having a unique transfer rate includes receiving data from the transfer source to be transferred to the transfer destination, and accumulating the data in a storage unit if at least one of the transfer rates of the transfer source and the transfer destination is different from a fixed rate; and transferring a portion of accumulated data to the transfer destination at a rate corresponding to the transfer rate of the transfer destination such that the data is transferred from the transfer source to the transfer destination at a fixed rate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
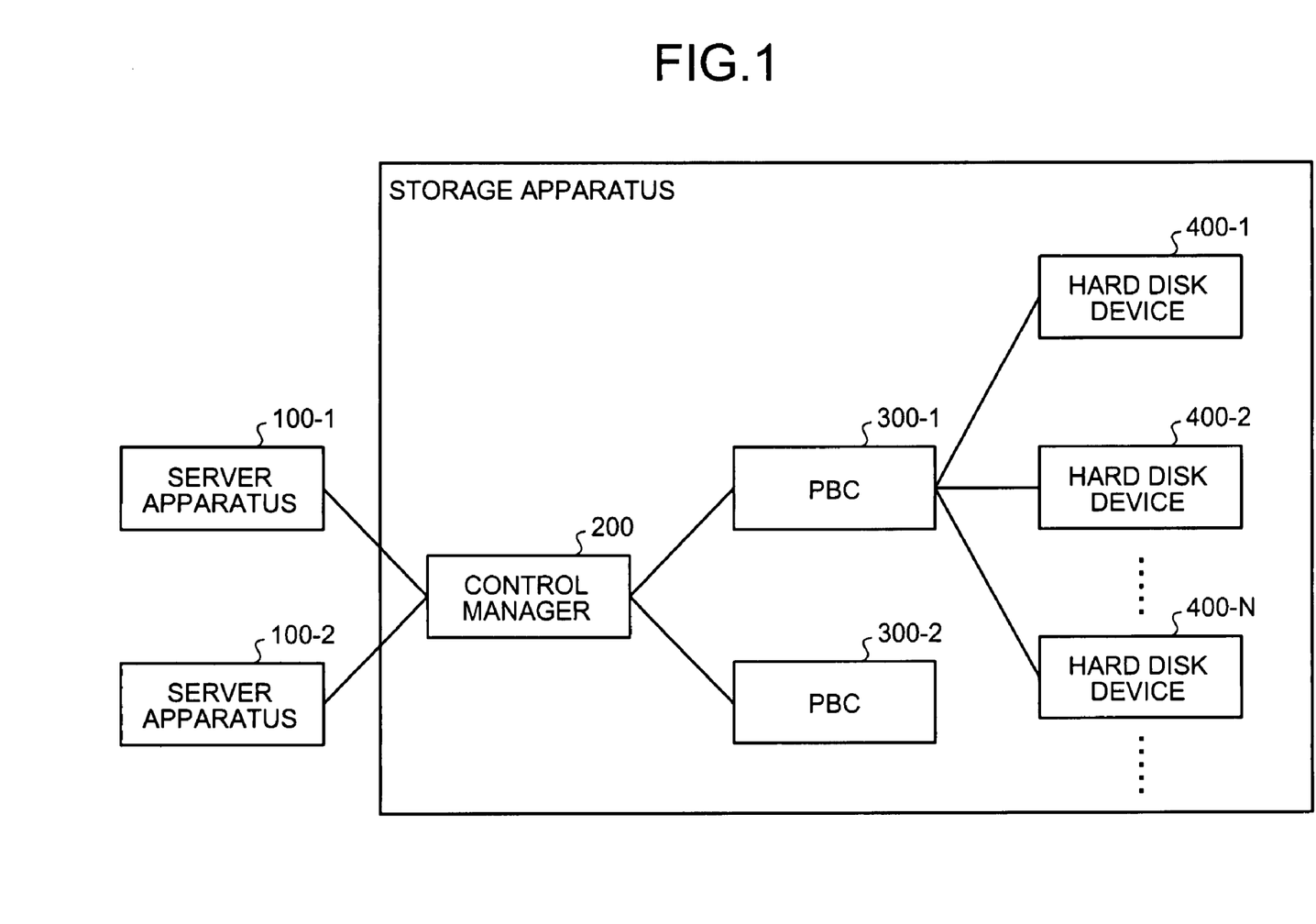
FIG. 1 is a block diagram of a storage apparatus according to a first embodiment of the present invention.

FIG. 1 is a block diagram of a storage apparatus according to a first embodiment of the present invention. The storage apparatus is connected to two server apparatuses 100-1 and 100-2. The storage apparatus includes a control manager 200, two port bypass circuits (PBCs) 300-1 and 300-2, and a plurality of hard disk devices 400-1 to 400-N (where N is an integer equal to or greater than two). The number of server apparatuses connected to the storage apparatus and the number of PBCs connected to the control manager 200 are not limited to two but can be one or more than two. Although not shown in FIG. 1, in the same manner as the PBC 300-1, a plurality of hard disk devices (hereinafter, "HD device") is connected to the PBC 300-2. The server apparatuses 100-1 and 100-2 will be generically referred to as "server apparatuses 100" and the PBCs 300-1 and 300-2 are generically referred to as "PBCs 300" hereinafter. The hard disk devices 400-1 to 400-N are large-capacity magnetic disks.

The server apparatus 100 executes various computer programs and reads data from one of the HD devices 400-1 to 400-N, processes the read data, and writes the processed data to one of the HD devices 400-1 to 400-N.

The control manager 200 manages movement of data between the server apparatus 100 and one of the HD devices 400-1 to 400-N, and that between two of the HD devices 400-1 to 400-N. Specifically, the control manager 200 accesses, i.e., makes a 'read access' to, one of the HD devices 400-1 to 400-N that stores therein data required by the server apparatus 100 when the server apparatus 100 executes a computer program, reads the necessary data from the accessed HD device, and transfers the read data to the server apparatus 100. When data is transferred from the server apparatus 100, the control manager 200 accesses, i.e., makes a 'write access' to, one of the HD devices 400-1 to 400-N and writes the data transferred from the server apparatus 100 to the accessed HD device. The control manager 200 also reads and writes data from/to each of the HD devices 400-1 to 400-N when each of them creates, for example, a backup copy.

The PBC 300 mediates in transmission and reception of data between the control manager 200 and one of the HD devices 400-1 to 400-N. That is, the PBC 300 functions as a switch controlled by the control manager 200 and connects one of the HD devices 400-1 to 400-N to which data are written or from which data are to be read, to the control manager 200.

The PBC 300 transmits and receives data to and from all the HD devices 400-1 to 400-N only at the same transfer rate. However, one or more of the HD devices 400-1 to 400-N can have different data transfer rate than others. To cope with the HD devices having different data transfer rates, the PBC 300 is connected to the HD devices 400-1 to 400-N via respective converter chips. The converter chips perform conversion of the respective transfer rates. Conversion of the transfer rates by the conversion chip will be explained later.

The HD devices 400-1 to 400-N are connected to the control manager 200 and the PBC 300 to be thereby connected to one another into a loop via the control manager 200 and the PBC 300. Each of the HD devices 400-1 to 400-N outputs and stores therein data in response to the read access or the write access from the control manager 200.

Figure 2:
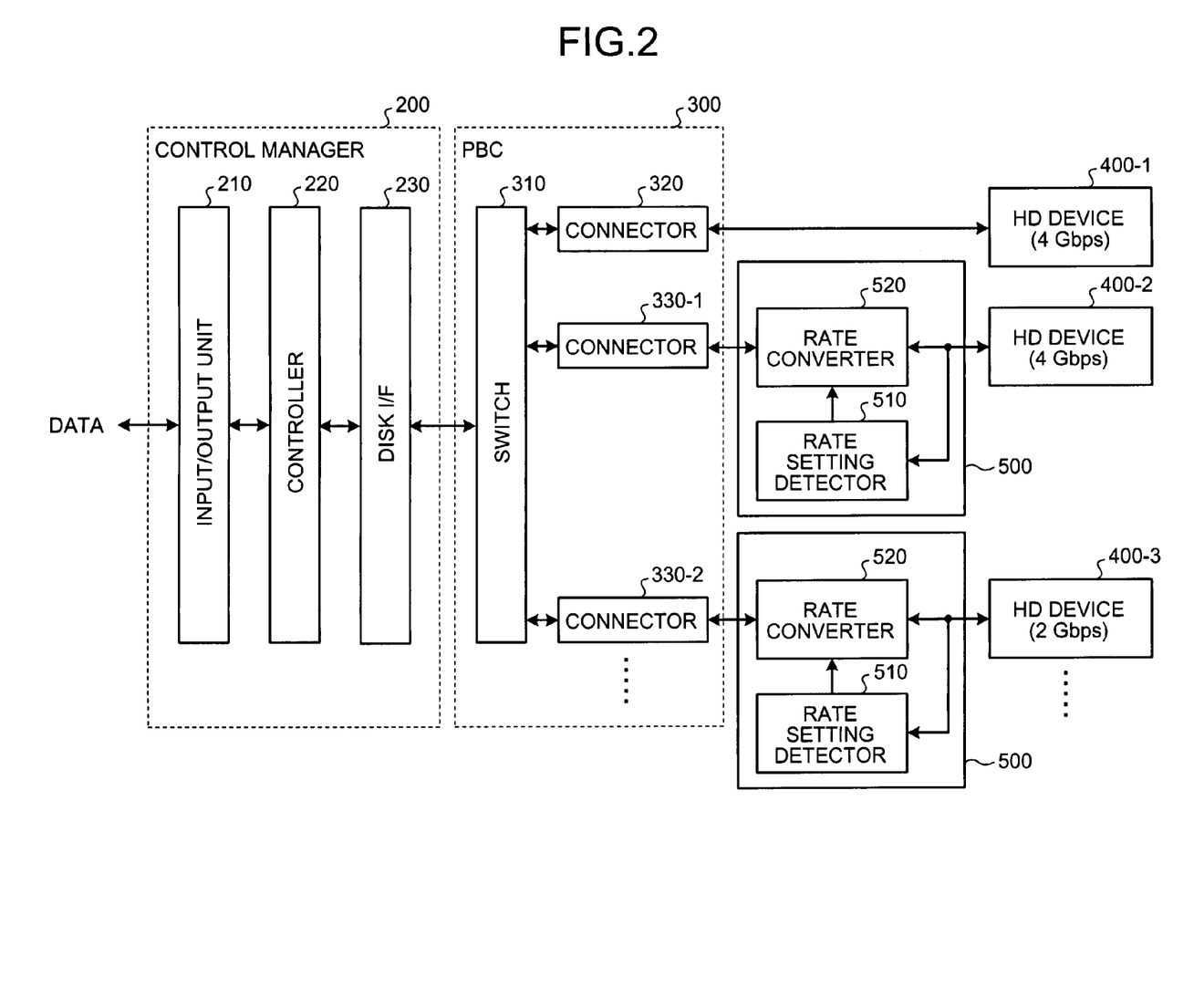
FIG. 2 is a detailed block diagram of the storage apparatus shown in FIG. 1.

FIG. 2 is a detailed block diagram of the storage apparatus shown in FIG. 1. The storage apparatus includes converter chips 500 in addition to the structure shown in FIG. 1. It is assumed that the transfer rates of the HD devices 400-1 and 400-2 are 4 Gbps, and that the transfer rate of the HD device 400-3 is 2 Gbps. The other HD devices 400-4 to 400-N have not been shown in FIG. 2; however, the HD devices 400-4 to 400-N can be connected to the PBC 300 in the same manner as the HD devices 400-1 to 400-3.

The control manager 200 includes an input/output unit 210, a controller 220, and a disk interface (hereinafter, "disk I/F") 230. The input/output unit 210 transmits and receives data to and from the server apparatus 100.

The controller 220 controls so that data received by the input/output unit 210 from the server apparatus 100 or data received by the disk I/F 230 from one of the HD devices 400-1 to 400-3 is transferred to an appropriate destination. That is, the controller 220 outputs data that is to be transferred to the server apparatus 100 to the input/output unit 210, and outputs data that is to be transferred to one of the HD devices 400-1 to 400-3 to the disk I/F 230.

The disk I/F 230 is connected to the HD devices 400-1 to 400-3 via the PBC 300, and transmits and receives data to and from the HD devices 400-1 to 400-3.

The PBC 300 includes a switch 310 and connectors 320, 330-1, and 330-2. The switch 310 switches over the transfer destination of data output from the control manager 200 so that the data is transferred to one of the HD devices 400-1 to 400-3 under control of the controller 220.

The connector 320 is connected to the HD device 400-1. In other words, exchange of data between the PBC 300 and the HD device 400-1 is performed via the connector 320. Only the HD device 400-1 having a transfer rate of 4 Gbps is connected to the connector 320, and no new HD device can be connected to the connector 320. In other words, the transfer rate of the HD device connected to the connector 320 is known and it does not change. The transfer rate of the HD device 400-1, which is known, is used to perform exchange of data between the PBC 300 and the HD devices 400-1 to 400-3. Therefore, the transfer rate of the HD device 400-1, i.e., 4 Gbps, is referred to as fixed rate.

The connectors 330-1 and 330-2 are connected respectively to the HD devices 400-2 and 400-3, and transmit and receive data to and from the HD devices 400-2 and 400-3. Precisely, the connector 330-1 is connected to the HD device 400-2 via one converter chip 500, and the connector 330-2 is connected to the HD device 400-3 via another converter chip 500. Any other HD devices can be connected to the connectors 330-1 and 330-2, or the HD devices 400-2 and 400-3 can be replaced with other HD devices. In other words, transfer rates of the HD devices connected to the connectors 330-1 and 330-2 are unknown until the HD devices are really connected. Assume that the HD device 400-2 has a transfer rate of 4 Gbps, and the HD device 400-3 has a transfer rate of 2 Gbps. The converter chips 500 convert the transfer rate of data exchange between the connectors 330-1 and 330-2 and the HD devices 400-2 and 400-3 to the fixed rate.

While only three connectors 320, 330-1, and 330-2 are shown in FIG. 2, the PBC 300 includes one connector for each HD device. In this case, connectors to which the HD devices are connected beforehand are similar to the connector 320, and those to which HD devices can be connected at a later stage, i.e., "added", are similar to the connectors 330-1 and 330-2.

Each of the converter chips 500 includes a rate setting detector 510 and a rate converter 520. The rate setting detector 510 detects setting information relating to the transfer rate of the HD device 400-2 or 400-3 when the HD device 400-2 or 400-3 is added, and notifies the detected transfer rate to the rate converter 520.

Some of the HD devices available in the market have a hard pin whose status is adjusted depending on the transfer rate of the HD device when connecting the HD device to another device. The rate setting detector 510 can be configured to detect a transfer rate of an HD device from the status of the hard pin of that HD device. Thus, the rate setting detectors 510 corresponding to the HD device 400-2 detects that the transfer rate of the HD device 400-2 is 4 Gbps, and the rate setting detectors 510 corresponding to the HD device 400-3 detects that the transfer rate of the HD device 400-3 is 2 Gbps.

Some of the HD devices store therein information, i.e., internal information, on the transfer rate of the HD device. The rate setting detector 510 can be configured to read the internal information on the transfer rate of a HD device when the HD device is added.

Some of the HD devices do not store therein information on the transfer rate but store therein information such as maker name and model number of the HD device. The rate setting detector 510 can be configured to store therein a lookup table of transfer rates, maker names, and model numbers, read the maker name and model number from an HD device when the HD device is added, and obtain the transfer rate of an HD device from the read maker name and model number and the lookup table.

If the transfer rate of the HD device 400-2 or 400-3 differs from the fixed rate, the rate converter 520 temporarily accumulates data to be read from or data to be written to the HD device 400-2 or 400-3. The rate converter 520 accumulates the data so that exchange of data between the HD device 400-2 or 400-3 and the PBC 300 is apparently performed at the fixed rate.

Specifically, because the transfer rate of the HD device 400-2 is 4 Gbps, i.e., the same as the fixed rate, the rate converter 520 corresponding to the HD device 400-2 allows the data to be passed between the HD device 400-2 and the PBC 300 without temporarily accumulating the data. However, the transfer rate of the HD device 400-3 is 2 Gbps, which is half of the fixed rate. When data is to be sent to the HD device 400-3 from the PBC 300, the rate converter 520 corresponding to the HD device 400-3 temporarily accumulates the data, which comes in from the PBC 300 at the fixed rate of 4 Gbps, and outputs the data to the HD device 400-3 at the transfer rate of 2 Gbps, which is the transfer rate of the HD device 400-3. When data is to be sent to the PBC 300 from the HD device 400-3, the rate converter 520 corresponding to the HD device 400-3 temporarily accumulates the data, which comes in from the HD device 400-3 at the transfer rate of 2 Gbps, which is the transfer rate of the HD device 400-3, and outputs the data to the PBC 300 at the fixed rate of 4 Gbps.

Namely, the rate converter 520 of the converter chip 500 connected to the HD device 400-3 outputs two pieces of 2-gigabyte data read from the HD device 400-3 at 2 seconds' intervals, i.e., a total of 4 gigabytes, to the PBC 300 in 1 second. Furthermore, the rate converter 520 divides 4-gigabyte data output from the PBC 300 in one second into two pieces of 2-gigabyte data, and outputs each of the 2-gigabyte data to the HD device 400-3 in two seconds. The PBC 300 can, therefore, ignore the difference in transfer rate among the HD devices 400-1 to 400-3, and can control the movement of data as if all the HD devices 400-1 to 400-3 transfer data at the fixed rate.

Figure 3:
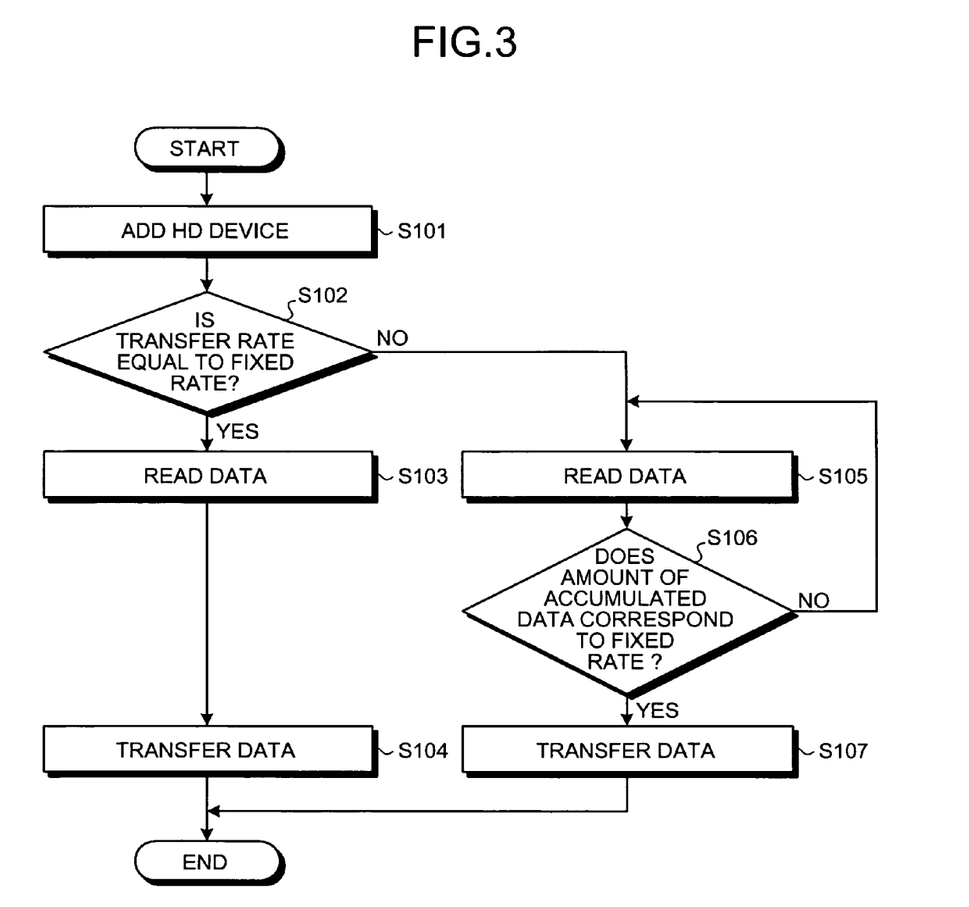
FIG. 3 is a flowchart of a read access operation performed by the storage apparatus shown in FIG. 1.

A read access operation performed in the storage apparatus thus configured for making a read access to one of the HD devices 400-1 to 400-N will next be explained with reference to the flowchart shown in FIG. 3. In the first embodiment, the read access operation performed when an HD device is added and data is read from the added HD device will be explained.

A HD device is added and connected to the PBC 300 (step S101). At this time, the HD device is connected, via the converter chip 500, to the connector 330-1 or 330-2 to which additional HD devices are to be connected. The connector to which the added HD device is connected will be referred to as "connector 330" hereinafter.

When the added HD device is connected, via the converter chip 500, to the connector 330, the rate setting detector 510 of the converter chip 500 detects the transfer rate of the HD device. Specifically, the rate setting detector 510 detects the transfer rate of the HD device by detecting the status of the hard pin provided in the HD device or by reading the internal information on the HD device. The rate setting detector 510 notifies the rate converter 520 of the detected transfer rate.

The rate converter 520 determines whether the transfer rate is equal to the fixed rate (step S102). That is, the rate converter 520 determines whether the transfer rate of the added HD device is equal to the fixed rate at which the PBC 300 operates. If the transfer rate is equal to the fixed rate (Yes at step S102), data is read from the HD device (step S103). Furthermore, data transferred from the HD device at the fixed rate passes through the rate converter 520 without rate conversion and is output to the PBC 300. The PBC 300 outputs the data to the control manager 200, from which the data is transferred to the server apparatus 100, the other HD device or the like under control of the controller 220 (step S104).

On the other hand, if the transfer rate of the added HD device differs from the fixed rate (No at step S102), data is read from the HD device (step S105). Furthermore, the data transferred from the HD device at the transfer rate different from the fixed rate is accumulated in the rate converter 520. The rate converter 520 monitors whether the amount of accumulated data corresponds to the fixed rate (step S106). It is assumed herein that the transfer rate of the added HD device is lower than the fixed rate and that the data is not accumulated in the rate converter 520 by an amount corresponding to the fixed rate (No at step S106). If so, data transferred from the HD device is continuously accumulated in the rate converter 520.

When the data is accumulated in the rate converter 520 by the mount corresponding to the fixed rate (Yes at step S106), the accumulated data is output altogether from the rate converter 520 to the PBC 300, then output from the PBC 300 to the control manager 200, and transferred to the server apparatus 100 or the other HD device under control of the controller 220 (step S107). The data is output from the rate converter 520 to the PBC 300 for longer time. However, because of output of the data apparently at the fixed rate, the PBC 300 can read the data from the HD device as if transfer rates of all the connected HD devices are equal to the fixed rate.

Figure 4:
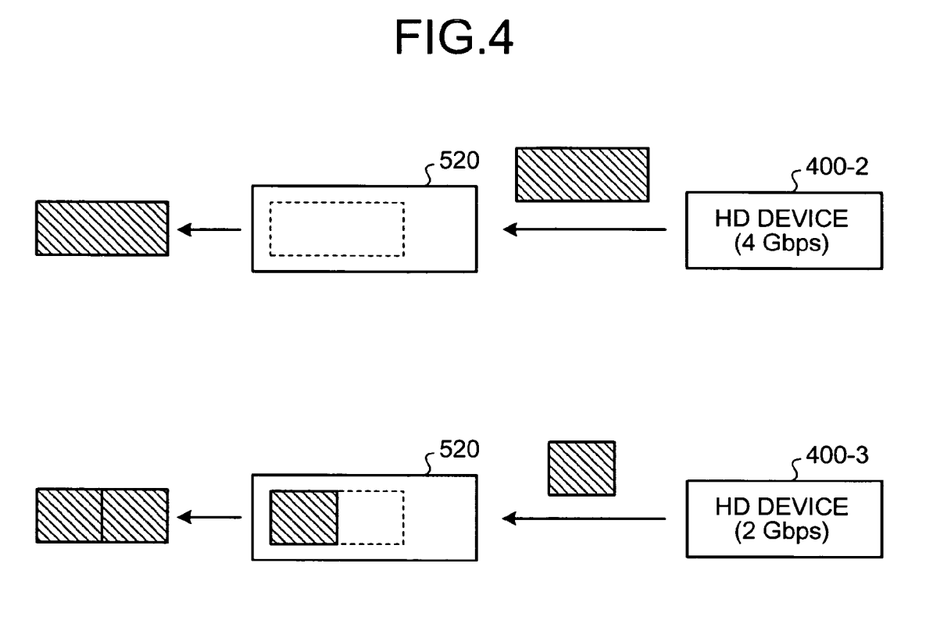
FIG. 4 is a schematic for explaining specific examples of the read access operation shown in FIG. 3.

FIG. 4 is a schematic of specific examples of the read access operation explained with reference to FIG. 3. A read access to the HD device 400-2 whose transfer rate (4 Gbps) is equal to the fixed rate is shown in the top section of FIG. 4. A read access from the HD device 400-3 whose transfer rate (2 Gbps) is smaller than the fixed rate is shown in the bottom section. Data read from the HD devices 400-2 and 400-3 is indicated by diagonal lines in FIG. 4.

As shown in the top section of FIG. 4, data read at the fixed rate from the HD device 400-2 is output without being accumulated in the rate converter 520. In the bottom section of FIG. 4, data read from the HD device 400-3 at the transfer rate lower than the fixed rate is accumulated in the rate converter 520, and output after the data is accumulated by the amount corresponding to the fixed rate. Since the transfer rate of the HD device 400-3 is half of the fixed rate in the first embodiment, the amount of data read from the HD device 400-3 per unit of time is half the amount of data read from the HD device 400-2. Moreover, data is accumulated in the rate converter 520 by an amount corresponding to two units of time before being output.

An interval at which data is output from the rate converter 520 of the converter chip 500 connected to the HD device 400-3 is, therefore, twice as long as an interval at which data is output from the rate converter 520 of the converter chip 500 connected to the HD device 400-2. However, the amounts of data output altogether from the both rate converters 520 are the same. Therefore, the read accesses to HD devices having different transfer rates can be controlled irrespectively of the difference in transfer rate. In other words, a mixture of HD devices having different transfer rates can be provided within the storage apparatus.

It has been explained above that the data is not output to the PBC 300 until data is accumulated in the rate converter 520 by the amount corresponding to the fixed rate. Alternatively, if the amount of data read from the HD device is small, the data accumulated in the rate converter 520 for a predetermined time after being read from the HD device can be output sequentially to the PBC 300 at the fixed rate. In this alternative, the amount of data accumulated in the rate converter 520 is smaller than that corresponding to the fixed rate. However, an insufficient amount can be supplemented by idle data that does not contain any information, so that data can be output at the fixed rate from the rate converter 520 to the PBC 300.

Figure 5:
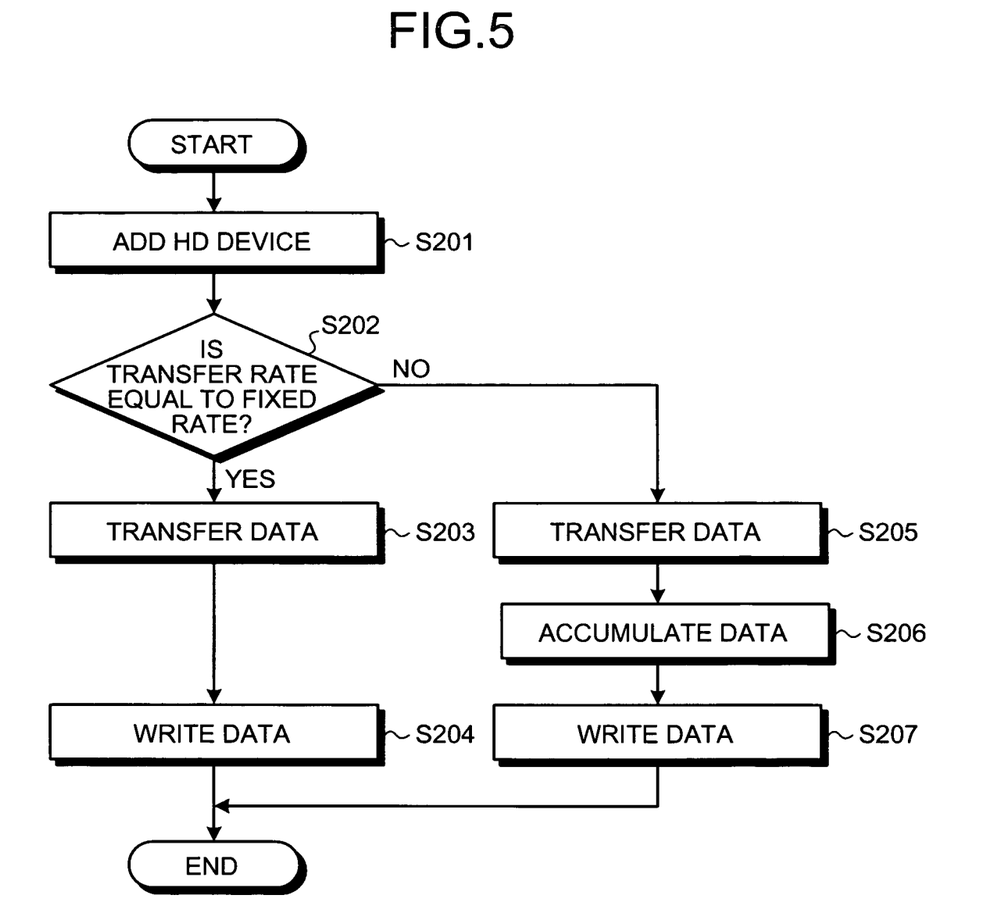
FIG. 5 is a flowchart of a write access operation performed by the storage apparatus shown in FIG. 1.

A write access operation performed in the storage apparatus for making a write access to one of the HD devices 400-1 to 400-N according to the first embodiment will be explained with reference to the flowchart shown in FIG. 5. In the first embodiment, the write access operation performed when an HD device is added and data is written to the added HD device will be explained.

A HD device is added and connected to the PBC 300 (step S201). At this time, the HD device is connected, via the converter chip 500, to the connector 330.

When the added HD device is connected, via the converter chip 500, to the connector 330, the rate setting detector 510 of the converter chip 500 detects the transfer rate of the HD device. Specifically, the rate setting detector 510 detects the transfer rate of the HD device by detecting the status of the hard pin provided in the HD device or by reading the internal information on the HD device. The rate setting detector 510 notifies the rate converter 520 of the detected transfer rate.

The rate converter 520 determines whether the transfer rate is equal to the fixed rate (step S202). That is, the rate converter 520 determines whether the transfer rate of the added HD device is equal to the fixed rate at which the PBC 300 operates. If the transfer rate is equal to the fixed rate (Yes at step S202), data to be written to the HD device is transferred from the server apparatus 100 or the other HD device, via the control manager 200, to the PBC 300 (step S203). This data passes through the rate converter 520 of the converter chip 500 without rate conversion and is written to the HD device (step S204).

On the other hand, if the transfer rate of the added HD device differs from the fixed rate (No at step S202), data to be written to the HD device is transferred from the server apparatus 100 or the other HD device, via the control manager 200, to the PBC 300 (step S205). This data is accumulated in the rate converter 520 of the converter chip 500 (step S206). The data accumulated in the rate converter 520 is written sequentially to the HD device at a lower transfer rate than the fixed rate (step S207). At this time, since data is output from the PBC 300 at the fixed rate, the PBC 300 can write the data to the HD device as if transfer rates of all the connected HD devices are equal to the fixed rate.

Figure 6:
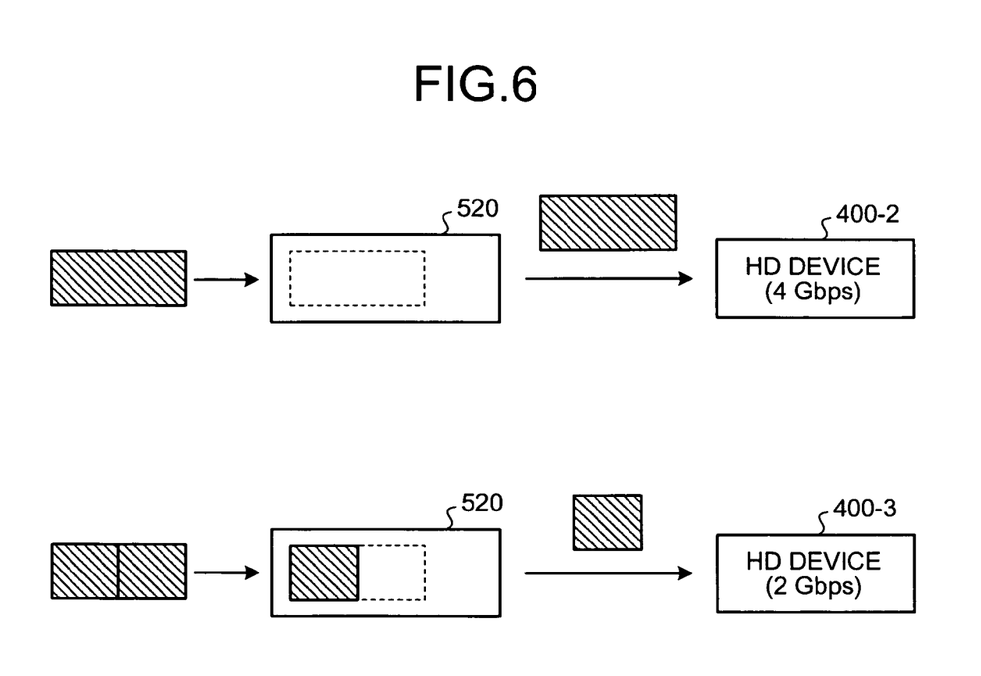
FIG. 6 is a schematic for explaining specific examples of the write access operation shown in FIG. 5.

FIG. 6 is a schematic of specific examples of the write access operation explained with reference to FIG. 5. A write access to the HD device 400-2 whose transfer rate (4 Gbps) is equal to the fixed rate is shown in the top section of FIG. 6. A write access to the HD device 400-3 whose transfer rate (2 Gbps) is smaller than the fixed rate is shown in the bottom section. Data written to the HD devices 400-2 and 400-3 is indicated by diagonal lines in FIG. 6.

As shown in the top section of FIG. 6, when data to be written to the HD device 400-2 is output from the PBC 300 at the fixed rate, it is transferred to the HD device 400-2 at the fixed rate without being accumulated in the rate converter 520. On the other hand, as shown in the bottom section of FIG. 6, when data to be written to the HD device 400-3 is output from the PBC 300 at the fixed rate, it is transferred to the HD device 400-3 at the transfer rate lower than the fixed rate, and data that cannot be transferred is accumulated in the rate converter 520. Since the transfer rate of the HD device 400-3 is half of the fixed rate in the first embodiment, the amount of data written to the HD device 400-3 per unit of time is half the amount of data written to the HD device 400-2. Half of the data output from the PBC 300 in one unit of time is accumulated in the rate converter 520, whereby the data is transferred to the HD device 400-3 for two units of time separately.

Consequently, although the data is temporarily accumulated in the rate converter 520 of the converter chip 500 connected to the HD device 400-3, the amount of data output from the PBC 300 is the same. Therefore, the write accesses to HD devices having different transfer rates can be controlled irrespectively of the difference in transfer rate. In other words, a mixture of HD devices having different transfer rates can be provided within the storage apparatus. To provide a mixture of HD devices having different transfer rates in the storage apparatus, there is no need for the PBC 300 to consider the difference in transfer rate among the HD devices. Moreover, there is no need to perform processes such as that for momentarily turning off the power to change the fixed rate of the PBC 300. This is because the converter chip 500 converts the transfer rates of the HD devices. Further, during both the read access and the write access, the apparent rate can be converted by a comparatively simple circuit configuration only for temporary data buffering. It is thereby possible to minimize an increase in circuit scale.

As described above, according to the first embodiment, the transfer rate of the added HD device is detected. If the detected transfer rate differs from the fixed rate at which the PBC operates, data to be read from or to be written to the added HD device is temporarily accumulated before actual transfer control. Therefore, while the transfer of data is being controlled, the transfer rate can be made coincident with the fixed rate and the difference in transfer rate among the HD devices can be ignored. As a result, an increase in the circuit size can be suppressed while enabling a mixture of storages having different transfer rates to be present in one network.

A storage apparatus according to a second embodiment of the invention has the following feature. If the amount of data to be written is large during a write access to an HD device whose transfer rate is lower than the fixed rate, the data is temporarily saved in a different HD device whose transfer rate is equal to the fixed rate.

Figure 7:
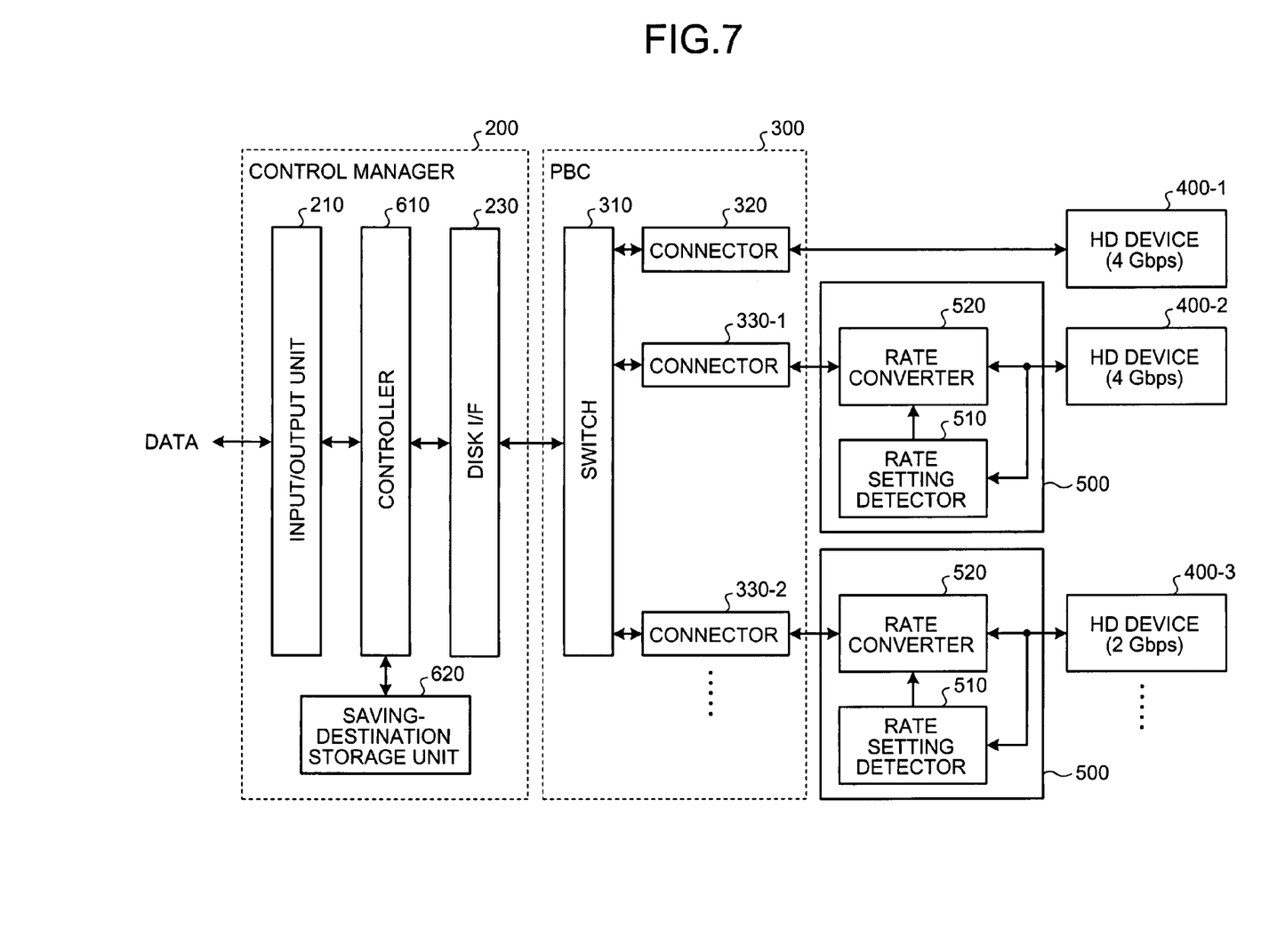
FIG. 7 is a detailed block diagram of a storage apparatus according to a second embodiment of the present invention.

FIG. 7 is a block diagram of a configuration of relevant constituent elements of a storage apparatus according to the second embodiment. In FIG. 7, like reference numerals denote like parts as those shown in FIG. 2, and their explanation will be omitted. In the storage apparatus shown in FIG. 7, the controller 220 of the control manager 200 shown in FIG. 2 is replaced by a controller 610, and a saving-destination-information storage unit 620 is additionally included in the control manager 200.

The controller 610 controls data received by the input/output unit 210 from the server apparatus 100 or data output from one of the HD devices 400-1 to 400-3 to be transferred to an appropriate transfer destination, and outputs the data to the input/output unit 210 or to the disk I/F 230. The controller 610 monitors the amount of data accumulated in the rate converter 520 of the conversion chip 500 connected between the PBC 300 and each of the HD devices 400-2 and 400-3. If data is accumulated in the rate converter 520 by an amount equal to or larger than a predetermined amount and a write processing load is heavy, the controller 610 temporarily saves data to be written to the HD device 400-2 or 400-3 in a different HD device (e.g., HD device 400-1) whose transfer rate is equal to the fixed rate. Specifically, the controller 610 stores the data in, for example, the HD device 400-1 via the PBC 300, and stores information on the HD device 400-1 where the data has been saved as a data saving destination in the saving-destination-information storage unit 620. When the write processing load decreases, the controller 610 reads the information on the data saving destination from the saving-destination-information storage unit 620 and transfers the saved data to the HD device 400-2 or 400-3.

In this way, the saving-destination-information storage unit 620 stores the information on the HD device that is selected by the controller 610 as the temporary data saving destination. When the saved data is transferred to the HD device that is a correct write destination, the saving-destination-information storage unit 620 deletes the information on the saving destination stored therein.

In the first embodiment, during the write access to the HD device whose transfer rate is lower than the fixed rate (e.g., HD device 400-3), the data is output from the PBC 300 at the fixed rate by accumulating the data in the rate converter 520. However, if the write processing load is heavy and a large amount of data is continually output to the rate converter 520, all the data cannot be accumulated in the rate converter 520. Accordingly, in the second embodiment, when the amount of data accumulated in the rate converter 520 reaches a predetermined amount, the data to be accumulated in the rate converter 520 is saved in the data saving destination, i.e., HD device whose transfer rate is equal to the fixed rate, and the data is transferred to the HD device that is the correct write destination of the saved data at nighttime or the like when the write processing load decreases.

Figure 8:
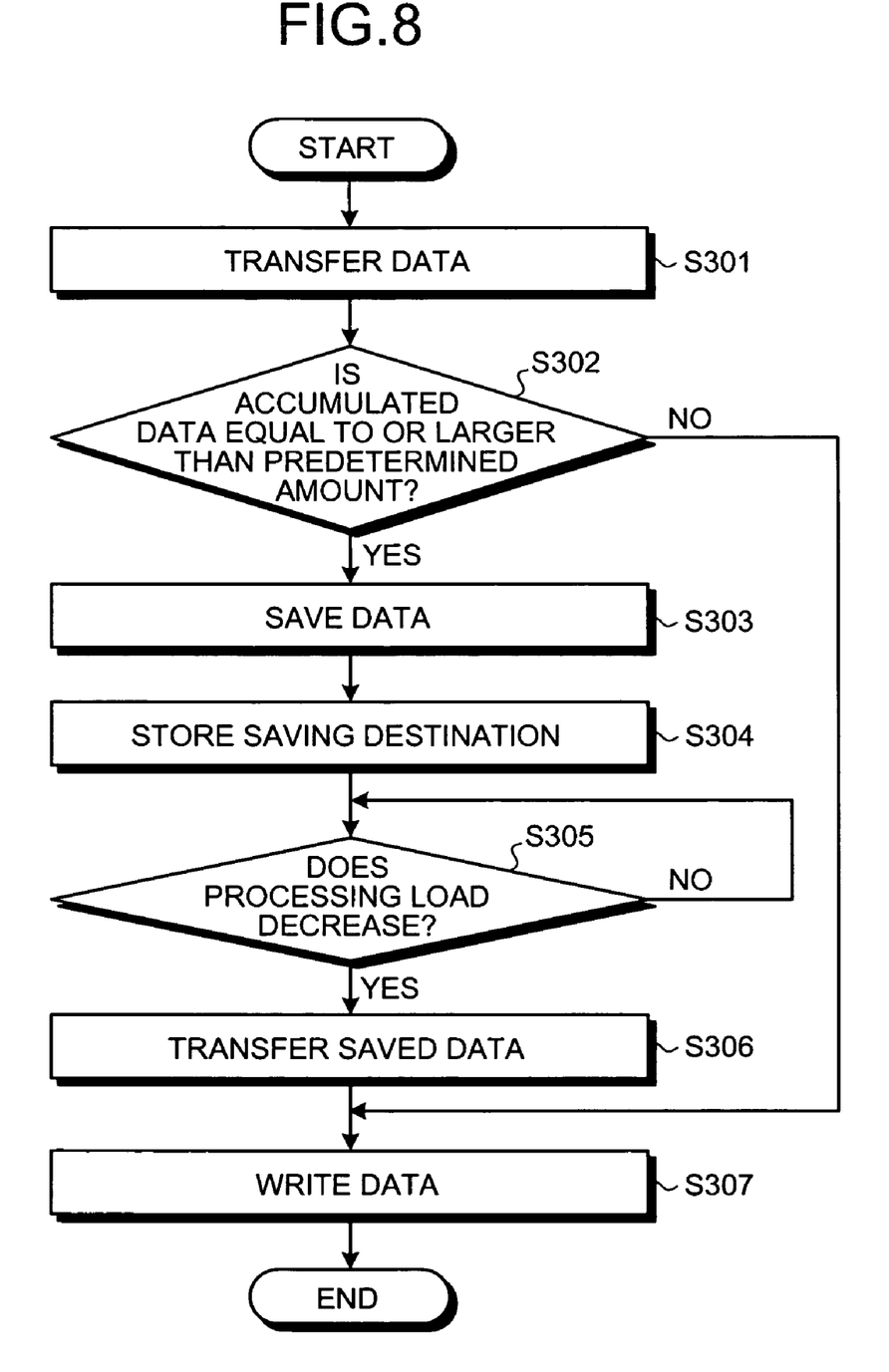
FIG. 8 is a flowchart of a write access operation performed by the storage apparatus shown in FIG. 7.

A write access operation performed in the storage apparatus thus configured for making a write access to one of the HD devices 400-1 to 400-N according to the second embodiment will be explained with reference to the flowchart shown in FIG. 8. In the second embodiment, the write access operation performed when making a write access to the HD device whose transfer rate is lower than the fixed rate will be explained. A connector to which an HD device whose transfer rate is lower than the fixed rate is connected will be referred to as "connector 330" hereinafter.

When data to be written to an HD device is transferred from the server apparatus 100 or from the other HD device to the control manager 200 (step S301), the data is input to the controller 610. Since the data is to be written to the HD device 400-3 whose transfer rate is lower than the fixed rate, it is accumulated in the rate converter 520 of the converter chip 500 via the PBC 300. In the second embodiment, the controller 610 monitors the amount of data accumulated in the rate converter 520 and determines whether the accumulated data is equal to or larger than a predetermined amount (step S302). If the controller 610 determines that the amount of data accumulated in the rate converter 520 is smaller than the predetermined amount (No at step S302), the controller 610 considers that there is still space in the rate converter 520. Furthermore, the data is accumulated in the rate converter 520 in the same manner as that in the first embodiment, and the accumulated data is sequentially transferred and written to the HD device (step S307).

On the other hand, if the amount of data accumulated in the rate converter 520 is equal to or larger than the predetermined amount (Yes at step S302), the controller 610 determines that the write processing load exceeds a capacity of the rate converter 520 and saves the data in a different HD device (e.g., HD device 400-1) whose transfer rate is equal to the fixed rate (step S303). Simultaneously, the controller 610 stores the saving destination of the data in the saving-destination-information storage unit 620 while making the saving destination correspond to the HD device that is the correct write destination (e.g., HD device 400-1) (step S304). The data saving destination can be any HD device whose transfer rate is equal to the fixed rate, the HD device 400-1 determined to be connected to the connector 320 beforehand or the added HD device 400-2. Regarding the added HD device 400-2, the controller 610 refers to the transfer rate detected by the rate setting detector 510 via the rate converter 520 and the PBC 300. If the controller 610 determines that the transfer rate of the HD device 400-2 is equal to the fixed rate, the HD device 400-2 is selected as a data saving destination candidate.

By thus saving the data to be written to the HD device whose transfer rate is lower than the fixed rate in the other HD device, processes can be performed by the entire storage apparatus smoothly without overflow of data from the rate converter 520. After the data is saved, the controller 610 constantly monitors whether the data accumulated in the rate converter 520 has decreased such that the write processing load for writing the data to the HD device whose transfer rate is lower than the fixed rate is equal to or lighter than a predetermined value (step S305). The controller 610 monitors the processing load in consideration of not only the amount of data accumulated in the rate converter 520 but also the frequency of requests to write data to the HD device, which requests are issued from the controller 610 within a fixed period of time. If the controller 610 determines that the processing load has not decreased (No at step S305), the controller 610 continues monitoring the processing load.

Upon determining that the write processing load has decreased (Yes at step S305), the controller 610 refers to the saving-destination-information storage unit 620 and reads, in combination, the saving destination and the correct write destination of the data. The controller 610 re-reads the data saved at each saving destination and transfers the data, via the PBC 300, to the control manager 200 (step S306). That is, data from, for example, the HD device 400-1 set as the saving destination is input to the controller 610 of the control manager 200.

The data input to the controller 610 is output, via the switch 310 of the PBC 300, to the rate converter 520 of the converter chip 500 so as to be written to the correct write destination. Although the data is output from the PBC 300 to the rate converter 520 at the fixed rate, the data does not overflow from the rate converter 520 since the write processing load at this time has decreased and the amount of data accumulated in the rate converter 520 is smaller than the predetermined amount. Therefore, the data output from the PBC 300 is accumulated in the rate converter 520, and the accumulated data is sequentially transferred to and written to the HD device that is the correct write destination (step S307).

As described above, according to the second embodiment, if the write processing load for writing data to the HD device whose transfer rate is lower than the fixed rate is heavy, the data to be written to that HD device is temporarily saved in the HD device whose transfer rate is equal to the fixed rate. Moreover, the saved data is transferred to the HD device that is the correct write destination after the write processing load decreases. Therefore, when data is to be written to the HD device whose transfer rate is lower than the fixed rate, the entire storage apparatus can perform processes-smoothly without temporarily accumulating an excessive amount of data.

In each of the first and second embodiments, the storages included in the storage apparatus are only the HD devices 400-1 to 400-3. Alternatively, the other storages such as magnetic tape devices can be included in the storage apparatus. If these storages are arranged in a loop via the control manager 200 and the PBC 300, then apparent transfer rates of the storages can be made coincident with one another by the invention, and a mixture of storages having different transfer rates can be provided in a network. Even if the storages are not arranged in a loop, the apparent transfer rates can be made coincident and control over data movement can be simplified by the invention, and a mixture of storages having different transfer rates can be easily provided.

In each of the first and second embodiments, the highest transfer rate of those of the HD devices 400-1 to 400-3 is set as the fixed rate. However, the highest transfer rate is not necessarily equal to the fixed rate. For example, even if the storage apparatus includes an HD device whose transfer rate is higher than the fixed rate, the transfer rate can be converted apparently into the transfer rate equal to the fixed rate by accumulating data relating to the HD device in the rate converter 520 of the converter chip 500. It is to be noted, however, that the throughput of the entire storage apparatus is made maximum by making the fixed rate equal to the highest transfer rate.

In each of the first and second embodiments, the rate setting detector 510 in the converter chip 500 detects the transfer rate of each of the HD devices. Alternatively, the rate setting detector 510 can be included in, for example, the PBC 300, and the rate converter 520 in the converter chip 500 can be notified of the transfer rate detected by the rate setting detector 510 included in the PBC 300. With this alternative arrangement, the PBC 300 and the control manager 200 can easily grasp the transfer rate of each HD device.

According to an embodiment of the present invention, it is possible to control reading and writing of data while ignoring the difference in transfer rates among the storages with a comparatively simple circuit configuration in which the data is merely accumulated. As a result, an increase in circuit size can be suppressed and a mixture of storages having different transfer rates can be arranged in a network.

According to an embodiment of the present invention, transfer rates of the hard disk devices can be detected using the hard pin generally included in each of the hard disk devices. There is, therefore, no need to change or modify conventional hard disk devices.

According to an embodiment of the present invention, a transfer rate of even a hard disk device lack of a physical constituent element such as a hard pin can be detected based on internal information, such as the transfer rate itself or a type number, on the hard disk device.

According to an aspect of the present invention, the data read at the transfer rate lower than the fixed rate can be output at a rate apparently equal to the fixed rate, and the difference in transfer rate among the storages during data read can be ignored.

According to an aspect of the present invention, data input apparently at the fixed rate can be written at a transfer rate lower than the fixed rate, so that the difference in transfer rate among the storages during data write can be ignored.

According to an aspect of the present invention, it is possible to prevent the data from being accumulated by an excessive amount and overflowing an accumulation capacity.

According to an aspect of the present invention, it is possible to prevent the data from being accumulated by an excessive amount and overflowing an accumulation capacity, and eventually write the data to the storage that is the correct write destination.

According to an aspect of the present invention, data can be read or written from or to all the storages at the highest transfer rate, so that the maximum throughput of the storage apparatus can be ensured.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus transferring data upon reading data from or writing data to a plurality of storage units each having a unique transfer rate, the storage device comprising:
   a controlling unit that controls transferring of data at a fixed rate, the data read from or written to a storage unit;
   a detecting unit that is connected to the storage unit and detects a transfer rate of the storage unit; and
   a converting unit, which is provided between the storage unit and the controlling unit, determines whether the transfer rate detected by the detecting unit is equal to the fixed rate, and allows the data read from or written to the storage unit to pass through without accumulating when the transfer rate is equal to the fixed rate, while interconverting the transfer rate and the fixed rate by accumulating the data read from or written to the storage unit when the transfer rate is not equal to the fixed rate.

2. The storage apparatus according to claim 1, wherein the detecting unit detects the transfer rate of the storage unit based on a status of a hard pin of the storage unit.

3. The storage apparatus according to claim 1, wherein the detecting unit detects the transfer rate of the storage unit by reading information present in the storage unit.

4. The storage apparatus according to claim 1, wherein the controlling unit controls the transferring of data at the fixed rate equal to a highest transfer rate from among the transfer rates present in the transfer-rate storing unit of the storage units.

5. The storage apparatus according to claim 1, wherein the converting unit accumulates the data read from the storage unit at the transfer rate, and outputs the data accumulated to the controlling unit altogether, when an amount of the data accumulated is corresponding to the fixed rate.

6. The storage apparatus according to claim 1, wherein the converting unit accumulates the data input from the controlling unit at the fixed rate, and sequentially writes a portion of the data accumulated at the transfer rate to the storage unit.

7. The storage apparatus according to claim 1, wherein the converting unit accumulates the data read from the storage unit at the transfer rate, supplements the data accumulated by idle data, and outputs the data supplemented to the controlling unit at the fixed rate, when an amount of the data accumulated is smaller than an amount corresponding to the fixed rate.

8. The storage apparatus according to claim 1, wherein the controlling unit saves, when an amount of the data accumulated by the converting unit reaches a threshold, data exceeding the threshold to a temporary storage unit having a transfer rate equal to the fixed rate.

9. The storage apparatus according to claim 7, further comprising:

a saving destination storage unit that stores correspondence between the storage unit and the temporary storage unit, wherein the controlling unit retrieves, when the amount of the data accumulated by the converting unit drops below the threshold, data from the temporary storage unit and transfers to the storage unit.

10. A method of transferring data upon reading data from or writing data to a plurality of storage units each having a unique transfer rate, the method comprising:

detecting a transfer rate of a storage unit;

reading data from the storage unit at the transfer rate detected;

determining whether the transfer rate detected is equal to a fixed rate;

transferring the data read without accumulating at the fixed rate when the transfer rate is equal to the fixed rate, while converting the transfer rate to the fixed rate by accumulating the data read when the transfer rate is not equal to the fixed rate; and transferring the data accumulated at the fixed rate.

11. A method of transferring data upon reading data from or writing data to a plurality of storage units each having a unique transfer rate, the method comprising:

detecting a transfer rate of a storage unit;

transferring data to be written to the storage unit in a fixed rate;

determining whether the transfer rate detected is equal to the fixed rate;

writing the data transferred to the storage unit without accumulating at the fixed rate when the transfer rate is equal to the fixed rate, while converting the fixed rate to the transfer rate by accumulating the data transferred when the transfer rate is not equal to the fixed rate; and writing the data accumulated to the storage unit at the transfer rate.

\* \* \* \* \*